United States Patent [19]

Matsuo et al.

[11] Patent Number: 4,687,707
[45] Date of Patent: Aug. 18, 1987

[54] LOW REFLECTANCE TRANSPARENT MATERIAL HAVING ANTISOILING PROPERTIES

[75] Inventors: Masashi Matsuo; Nobuyuki Yamagishi; Makoto Noshiro, all of Yokohama; Yukio Jitsugiri, Yokosuka; Keiichi Ohnishi, Yokohama, all of Japan

[73] Assignee: Asahi Glass Company Ltd., Tokyo, Japan

[21] Appl. No.: 939,296

[22] Filed: Dec. 5, 1986

Related U.S. Application Data

[63] Continuation of Ser. No. 746,406, Jun. 19, 1985, abandoned.

[30] Foreign Application Priority Data

Jun. 26, 1984 [JP] Japan .................................. 59-129992
Mar. 19, 1985 [JP] Japan .................................. 60-53317
Apr. 19, 1985 [JP] Japan .................................. 60-82169

[51] Int. Cl.$^4$ ............................................ B32B 27/06
[52] U.S. Cl. ..................................... 428/336; 428/421; 428/422; 428/428; 428/432; 428/448; 428/463; 428/697; 428/702
[58] Field of Search ............... 428/336, 421, 422, 428, 428/432, 448, 697, 702, 463

[56] References Cited

U.S. PATENT DOCUMENTS 3,986,997 10/1976 Clark .................................... 428/412
4,211,823 7/1980 Suzuki et al. ........................ 428/412
4,478,873 10/1984 Masso et al. ........................... 427/40

FOREIGN PATENT DOCUMENTS 49960 3/1984 Japan .

OTHER PUBLICATIONS

T. Wydeven and R. Kubacki, Applied Optics, vol. 15, No. 1, Jan. 1976, Antireflection Coating Prepared by Plasma Polymerization of Perfluorobutene-2.

Primary Examiner—George F. Lesmes
Assistant Examiner—P. R. Schwartz
Attorney, Agent, or Firm—Oblon, Fisher, Spivak, McClelland & Maier

[57] ABSTRACT

A low reflectance transparent material having antisoiling properties, which comprises a transparent substrate and a multi-layer coating formed on the substrate, said coating comprising at least one thin layer of a condensation product containing a metal oxide, and a thin layer of a condensation product of a fluorine-containing silicon compound having a polyfluorinated carbon chain or a perfluorocarbon chain, formed thereon.

9 Claims, No Drawings ured by a usual washing operation, and if wiped with
LOW REFLECTANCE TRANSPARENT MATERIAL HAVING ANTISOILING PROPERTIES This application is a continuation of application Ser. No. 746,406, filed on June 19, 1985, now abandoned.

The present invention relates to a low reflectance transparent material with its surface having low reflecting properties. More particularly, it relates to a low reflectance transparent material having low reflecting properties and excellent antisoiling properties and durability, wherein a multi-layer coating is formed on a transparent substrate surface.

The transparency or see-through properties of transparent products such as windows of buildings, doors, show windows, show cases, windows of vehicles, optical lenses, eye glasses or the like, are likely to be impaired by a glare, glitering or a reflection of the scenery caused by the reflection of the sunlight or illumination light. Further, in the utilization of the sunlight, for instance, in order to improve the heat collecting efficiency of a solar heat warm-water generator, it is necessary to eliminate or reduce the reflection loss of a light-transmitting material such as glass or plastic used for the heat collecting element and thereby permit the passage of a great quantity of energy.

Heretofore, the prevention of the reflection on the surface of a transparent material such as glass or plastic has been studied and developed primarily for lenses as optical parts. It is known to form, by a vacuum vapour deposition method or a sputtering method, a single layer coating comprising $MgF_2$ or cryolite for the prevention of the reflection of visible light on the surface of glass or plastic, or a single layer coating comprising SiO, $CeO_2$ or ZnS, or a multilayer coating such as SiO-$MgF_2$ or arsenic trisulfide glass-$WO_2$-cryolite for infrared rays, or a single layer coating comprising $SiO_2$ or LiF for ultraviolet rays, and such coatings are practically used as antireflection coatings for optical lenses, lenses for eye glasses or filters.

On the other hand, there have been proposed a method and treating agent for forming an antireflection coating, whereby a treating agent for low reflectance comprising a polymeric substance is directly coated on the surface of glass or plastic, or the glass or plastic is immersed in the treating agent. As such a method and treating agent for forming an antireflection coating, there has been a disclosure of a process wherein for the purpose of improving the properties of the antireflection coating such as durability and abrasion resistance, a precoating layer is formed by treating a transparent material, particularly a plastic substrate, with a metal oxide-containing composition in a water-containing environment, and an antireflection coating comprising an organic silicon compound-containing composition is formed on the precoating layer (Japanese Unexamined Patent Publication No. 49960/1984).

For the formation of antireflection coatings, the vacuum vapour deposition method or sputtering method is rather restricted in its application to e.g. small size precision optical parts from the mechanical nature of the apparatus or from the aspect of costs. Further, such methods are not suitable for continuous mass production.

Further, in the case of an antireflection coating by a treating agent for low reflectance, the single layer coating for visible light exhibits antireflection effects only against a certain specific range of wavelength. Furthermore, antireflection coatings formed by the above-mentioned conventional treating agents for low reflectance are susceptible to stains, and the stains are hardly removed by a usual washing operation, and if wiped with a strong force, the coating is likely to be peeled.

Under these circumstances, there has been no low reflectance transparent material which fully satisfies the requirements for both antisoiling properties and high performance in the reduction of reflectance.

Accordingly, it is an object of the present invention to provide a low reflectance transparent material comprising a transparent substrate and a thin layer of an antireflection treating agent formed thereon, which can readily be formed by a conventional method such as coating, spraying or dipping without impairing the transparency or see-through properties, and which can be applied not only to small size precision optical parts but also to large transparent substrates.

Another object of the present invention is to provide a low reflectance transparent material having antisoiling properties, whereby the reflectance can be uniformly reduced over the entire region of visible light by the antireflection coating formed on the surface of the transparent substrate, and yet the coating has excellent antisoiling properties.

A further object of the present invention is to provide a low reflectance transparent material having excellent durability, whereby the antireflection coating formed on the surface of the transparent substrate maintains its properties for a long period of time.

The present invention provides a low reflectance transparent material having antisoiling properties, which comprises a transparent substrate and a multi-layer coating formed on the substrate, said coating comprising at least one thin layer of a condensation product containing a metal oxide, and a thin layer of a condensation product of a fluorine-containing silicon compound having a polyfluorinated carbon chain or a perfluorocarbon chain, formed thereon.

Now, the present invention will be described in detail with reference to preferred embodiments.

In the present invention, the transparent substrate is preferably made of glass or plastic. As the plastic, particularly transparent plastic, there may be mentioned, for instance, poly(diethyleneglycol bis-allylcarbonate), polymethyl methacrylate, polycarbonate, polystyrene or polyvinyl chloride. There is no particular restriction as to the shape or configuration of the substrate.

In the present invention, at least one thin layer formed on the surface of the transparent substrate, is advantageously a condensation product containing a metal oxide, which satisfies $nd = \lambda/4 - 3\lambda/4$ and which has excellent adhesion to an upper layer to be formed thereon. Such a metal oxide has excellent adhesion to a condensation product of a fluorine-containing silicon compound formed as an upper layer. By the formation of such a multi-layer coating, the reflection can be uniformly reduced over the entire region of visible light, and it is thereby possible to obtain a low reflectance transparent material having excellent antisoiling properties.

In the condensation product containing a metal oxide for the at least one thin layer, i.e. the under coating layer, formed on the surface of the transparent substrate, the metal oxide may suitably be a $TiO_2$ compound, a $SiO_2$ compound, a $ZrO_2$ compound, a $Ta_2O_5$ compound or a $Al_2O_3$ compound. As the condensation product containing such a metal oxide, there may be mentioned, as a TiO$_2$ compound, a titanium tetraalkoxides such as Ti(OCH$_3$)$_4$, Ti(OC$_2$H$_5$)$_4$, Ti(OC$_4$H$_7$)$_4$ or Ti(OC$_4$H$_9$)$_4$, or a low molecular weight polymer thereof, or a titanium chelate compound such as Ti(O-iC$_3$H$_7$)$_2$[OC(CH$_3$)CHCOCH$_3$]$_2$ or Ti(O-iC$_3$H$_7$)$_n$[OCH$_2$CH(C$_2$H$_5$)CH(OH)C$_3$H$_7$]$_{4-n}$. As a SiO$_2$ compound, there may be employed a tetraalkoxy silane such as Si(OCH$_3$)$_4$, Si(OC$_2$H$_5$)$_4$, Si(OC$_3$H$_7$)$_4$ or Si(OC$_4$H$_9$)$_4$, a trialkoxy silane such as HSi(OCH$_3$)$_3$, HSi(OC$_2$H$_5$)$_3$, HSi(OC$_4$H$_9$)$_3$, CH$_3$Si(OCH$_3$)$_3$, CH$_3$Si(OC$_2$H$_5$)$_3$, CH$_3$Si(OC$_3$H$_7$)$_3$ or CH$_3$Si(OC$_4$H$_9$)$_3$, or a silane coupling agent such as

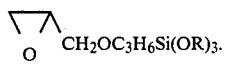

These metal oxides may be used alone. However, to adjust the refractive index, it is preferred to employ a co-condensation product of two components such as a TiO$_2$ compound and a SiO$_2$ compound, or a ZrO$_2$ compound and a SiO$_2$ compound, or of more components.

The refractive index of the condensation product containing metal oxides obtained by incorporating and reacting an additive to the above-mentioned TiO$_2$ compound and the SiO$_2$ compound, or the ZrO$_2$ compound and the SiO$_2$ compound, is within a range of 1.45 to 2.10.

Further, for the purpose of improving the adhesion and overcoming the brittleness of the thin layer composed of the condensation product of the metal oxide, other additives may be incorporated to form a co-condensation product. As other additives, there may be employed a polyhydric alcohol such polyethylene glycol or pentaerythritol, or a melamine resin or an epoxy resin. Such additives are useful for the improvement of the crack resistance and adhesion of the undercoating layer.

In the condensation product containing a metal oxide, the metal oxide is incorporated in the condensation product in an amount of at least 20% by weight, preferably at least 30% by weight. The condensation product containing a metal oxide is prepared in such a manner that after incorporating the metal oxide and, if necessary, the additives, the mixture is subjected to hydrolysis in a single or mixed solvent of alcohol-type such as ethanol or butanol. The hydrolysis is conducted at room temperature in the presence of acetic acid or hydrochloric acid as a catalyst.

The thin layer formed on the at least one thin layer of a condensation product containing a metal oxide, i.e. the top coating layer, is made of a condensation product of a fluorine-containing silicon compound having a polyfluorinated carbon chain or a perfluorocarbon chain. As the polyfluorinated carbon chain or the perfluorocarbon chain, there may be mentioned a perfluoroalkyl group or a perfluoroalkylene group. However, the perfluoroalkyl group is preferred in that it is thereby possible to advantageously improve the reduction of reflectance and the antisoiling properties.

The perfluoroalkyl group-containing compound has small polarizability of fluorine atoms, and accordingly the refractive index is low. For instance, the refractive index (at 25° C.—the same applies hereinafter) of C$_8$F$_{18}$ is 1.271, that of (C$_4$F$_9$)$_3$N is 1.290, and that of a polymer of (CF$_2$=CF$_2$/CF$_3$OCF=CF$_2$) is 1.330. Such a perfluoroalkyl group-containing compound is suitable as a treating agent for low reflectance, but for the fabrication into a thin layer and chemical adhesion, the presence of —Si—OR, —Si—Cl or the like is preferred. Accordingly, the condensation product of a fluorine-containing silicon compound in the present invention is preferably composed of a dialkoxy silane or trialkoxy silane having a perfluoroalkyl group containing from 3 to 20 carbon atoms, or a co-condensation product of a silane coupling agent with at least one compound selected from the group consisting of a dichlorosilane and a trichlorosilane.

Further, as the condensation product of the fluorine-containing compound, there may be employed a compound having a perfluoroalkylene group containing from 2 to 12 carbon atoms, and a silyl group at each end.

In the above compound, if the perfluoroalkyl group contains less than 3 carbon atoms, it is impossible to adequately satisfy the requirements for both the antisoiling properties and the reduction of reflectance. On the other hand, a fluorine-containing compound having carbon atoms greater than the above range is hardly available, and is economically disadvantageous.

As the above-mentioned fluorine-containing compounds, various types may be mentioned. For instance, the following fluorine-containing silane compounds may be mentioned;

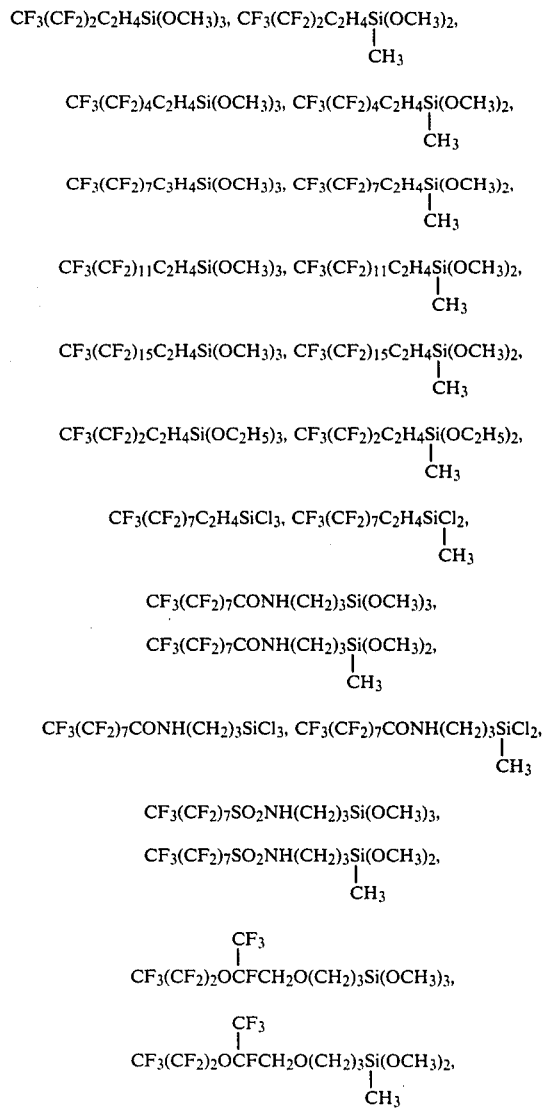

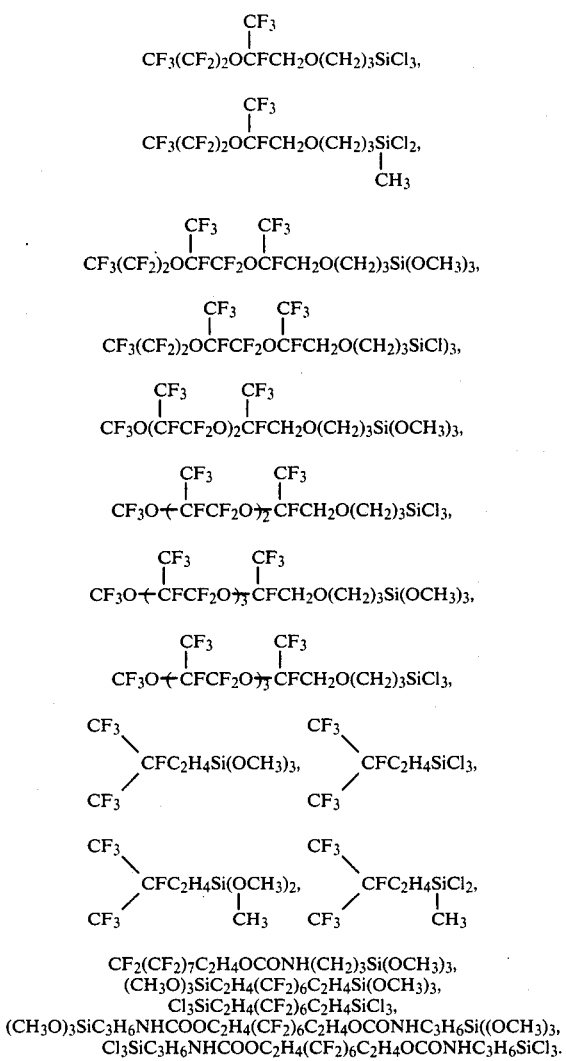

CF$_2$(CF$_2$)$_7$C$_2$H$_4$OCONH(CH$_2$)$_3$Si(OCH$_3$)$_3$,
(CH$_3$O)$_3$SiC$_2$H$_4$(CF$_2$)$_6$C$_2$H$_4$Si(OCH$_3$)$_3$,
Cl$_3$SiC$_2$H$_4$(CF$_2$)$_6$C$_2$H$_4$SiCl$_3$,
(CH$_3$O)$_3$SiC$_3$H$_6$NHCOOC$_2$H$_4$(CF$_2$)$_6$C$_2$H$_4$OCONHC$_3$H$_6$Si((OCH$_3$)$_3$,
Cl$_3$SiC$_3$H$_6$NHCOOC$_2$H$_4$(CF$_2$)$_6$C$_2$H$_4$OCONHC$_3$H$_6$SiCl$_3$.

These compounds are hydrolyzed and used in the form condensation products. Such condensation products have a refractive index within a range of from 1.33 to 1.44. The greater the fluorine content, the lower the refractive index. A desired refractive index can be obtained by properly selecting two or more fluorine-containing compounds among them.

As the silane coupling agent capable of forming the above-mentioned co-codensation product with the above fluorine-containing silane compound, there may be mentioned, for instance,

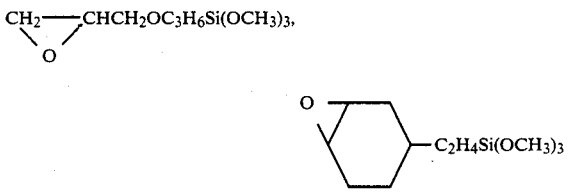

Si(OCH$_3$)$_4$, Si(OC$_2$H$_5$)$_4$, SiCl$_4$, HSiCl$_3$ and CH$_3$SiCl$_3$. Such a silane coupling agent is useful for a further improvement of the adhesion of the co-condensation product with the undercoating layer, and is usually incorporated in an amount of from 5 to 90% by weight, preferably from 10 to 75% by weight, relative to the fluorine-containing silane compound. Needless to say, the fluorine-containing silane compound can be practically useful even when it is not a co-condensation product with a silane coupling agent.

The condensation products or co-condensation products may be prepared by the hydrolysis in an alcohol solvent such as butanol, preferably tert-butanol, at room temperature in the presence of an acetic acid and an organic tin compound as catalysts.

For the formation of at least one thin layer of a condensation product containig a metal oxide on the surface of a transparent substrate, the thus prepared metal oxide-containing condensation product is applied to the surface of a transparent substrate by a conventional coating method such as brush coating, roll coating, spraying or dipping. After the application, the applied coating is dried at a temperature of from room temperature to 200° C., and the formed thin layer is heated and cured at a temperature of from 200° to 550° C. In the case where the transparent substrate is made of a plastic, the applied coating is dried at a temperature of from room temperature to 150° C. with no further treatment. The condensation product containing a metal oxide contains an alcohol solvent added during the preparation, and thus it has a proper fluidity and can readily be coated on the surface of the transparent substrate. Further, the cured thin layer is preferably subjected to activating treatment, e.g. by dipping it in a 2% hydrofluoric acid aqueous solution or in a 15% sodium hydroxide aqueous solution, followed by washing with water. By such a method, a thin layer of the condensation product containing a metal oxide, i.e. the undercoating layer, is formed on the surface of the transparent substrate.

A multi-layer undercoating may be formed by repeating the above method of forming the undercoating layer. However, a thin layer may be continuously formed to obtain a multi-layer coating. Such a method may be conducted by coating a metal oxide-containing condensation product on the surface of the transparent substrate, followed by drying as mentioned above to form a thin layer, and further coating the metal oxide-containing condensation product on the thin layer, followed by drying and then by heating and curing at a proper temperature.

When a multi-layer coating is formed, the respective thin layers are preferably different from one another in the metal oxide component or in the composition. However, the respective thin layers may be the same. The multi-layer construction, e.g. a double layer construction, of thin layers of a metal oxide-containing condensation product, brings about an improvement in the reduction of reflectance as compared with a single layer construction. However, it is useless to increase the number of layers unnecessarily. Further, such a multi-layer structure will be economically disadvantageous.

When the transparent substrate is made of a plastic, it is preferred to subject the plastic surface to activating treatment such as treatment with an alkaline solution, plasma treatment, glow discharge treatment or formation of a primer layer of a silane coupling agent or a functional group-containing acrylic resin, in order to improve the surface properties for the formation of the undercoating layer of the metal oxide-containing condensation product on the plastic surface.

Further, for the improvement of the properties of the undercoating layer and the top coating layer formed thereon and comprising the condensation product of a fluorine-containing silicon compound, it is preferred to subject the undercoating layer to activating treatment. As such activating treatment, there may be mentioned the dipping in a dilute hydrofluoric acid aqueous solution or in a sodium hydroxide aqueous solution, as mentioned above, followed by washing with water and drying.

Then, the top coating thin layer of the condensation product of a fluorine-containing silicon compound is formed on the at least one thin layer of the condensation product containing a metal oxide. There is no particular restriction to the method of coating the condensation product of a fluorine-containing silicon compound onto the above-mentioned thin layer. Namely, the top coating layer may be applied by brush coating, roll coating, spraying or dipping in the same manner as the above-mentioned coating method for the formation of the under-coating layer. After the application, the coated layer is heated at a temperature of from 120° to 250° C., or from 70° to 150° C. in the case where the transparent substrate is made of a plastic, and cured to form a thin layer. In the case of the plastic, it is preferred to conduct activating treatment such as mercury vapour lamp radiation.

In the present invention, the thickness of the undercoating layer of the condensation product containing a metal oxide, or the thickness of the top coating layer of condensation product of a fluorine-containing silicon compound formed on the undercoating layer, is determined by the above-mentioned equation of $nd = \lambda/4 - 3\lambda/4$. The thickness of the undercoating layer is usually at most 0.3 μm, preferably from 0.03 to 0.2 μm. The thickness of the top coating layer is usually at most 0.2 μm, preferably from 0.05 to 0.1 μm. Such a thickness can be controlled by adjusting the conditions for the coating method. For instance, in the dipping method, the thickness is determined by the concentration of the composition and the withdrawing speed.

The low reflectance glass of the present invention has an average reflectance of at most 1.6% in the visual light region, particularly at most 1.0% in the case where the undercoating layer is composed of a plurality of layers of a metal oxide-containing condensation product, and thus has substantially superior low reflecting properties as compared with the reflectance of 4.2% of ordinary soda lime glass. Yet, the formed thin layer has a pencil hardness of from H to 5H or higher. For instance, a thin layer composed solely of the condensation product of a fluorine-containing silicon compound is HB. Thus, the same layer of the present invention has substantially higher hardness. Further, the low reflectance material of the present invention shows excellent antisoiling properties, whereby the low reflecting properties will be maintained over a long period of time.

There is no particular restriction to the application of the low reflectance transparent material of the present invention. For instance, it may be employed for windows of buildings, transparent doors, show windows, show cases, windows of vehicles, optical lenses, lenses for eye glasses, filters, front non-glare plates for televisions, glass for watches or clocks or the like.

Now, the present invention will be described in further detail with reference to Examples. However, the present invention is by no means restricted by these specific Examples. In the Examples, the low reflectance material having antisoiling properties was evaluated by the following methods.

Reflectance:
An average reflectance was measured at an angle of incidence of 5° of a wavelength of from 400 to 700 nμm by means of an automatic recording spectrophtometer with a specular reflection measuring device (323 Model, manufactured by Hitachi, Ltd.).

Layer thickness:
The thickness was obtained by the measurement of needle pressure by means of "Talystep" (manufactured by Rank Taylor Hobson Co.).

Pencil Hardness:
The pencil hardness was measured by means of a pencil scratching tester (JIS-K5401).

Water repellency:
The contact angle of a water drop was measured.

Oil repellency:
The contact angle of hexadecane was measured.

PREPARATION EXAMPLE 1

Preparation of condensation products containing metal oxides for the undercoating layer The starting materials identified in Table 1 were mixed in the respective amounts (g) as identified in Table 1. The respective mixtures were reacted for one week under stirring at room temperature, and then filtered to obtain Treating Solutions No. A to No. P, i.e. treating solutions of $TiO_2$-containing condensation products, $SiO_2$-containing condensation products, $SiO_2$-$TiO_2$-containing condensation products and $SiO_2$-$ZrO_2$-containing condensation products.

TABLE 1

| | A | B | C | D | E | F | G | H | I | J | K | L | M | N | O | P |
|---|---|---|---|---|---|---|---|---|---|---|---|---|---|---|---|---|
| $Si(OC_2H_5)_4$ | 29.5 | 44.3 | 36.0 | 11.8 | 62.4 | 55.0 | 48.4 | 25.0 | — | 20.0 | 25.0 | 16.6 | 138.7 | 9.1 | 21.2 | 8.8 |
| $Ti(OC_4H_9)_4$ | 47.2 | 31.4 | 31.4 | — | 93.5 | 102.0 | 110.4 | 139.4 | 180.9 | — | 139.4 | 149.6 | — | 63.3 | 48.4 | — |
| $Zr(OC_4H_9)_4$ | — | — | — | 85.1 | — | — | — | — | — | 106.5 | — | — | — | — | — | 46.6 |
| Acetyl acetone | 20.5 | 20.5 | 20.5 | 20.5 | 55.0 | 60.1 | 65.2 | 82.1 | 106.5 | 55.6 | 82.1 | 88.1 | — | 37.3 | 28.5 | 24.3 |
| Water | 11.0 | 11.0 | 11.0 | 11.0 | 22.0 | 21.0 | 20.4 | 17.9 | 14.4 | 18.0 | 18.0 | 15.7 | 36.0 | 6.9 | 8.7 | 7.9 |
| Acetic acid (1%) | 2.1 | 2.1 | 2.1 | 2.1 | 4.2 | 4.0 | 3.9 | 3.4 | 2.7 | 3.4 | 3.4 | 3.0 | 4.2 | 1.3 | 1.7 | 1.5 |
| Ethyl acetate | 1.8 | 1.8 | 1.8 | 1.8 | 2.0 | 2.0 | 2.0 | 2.0 | 2.0 | 2.0 | 2.0 | 2.0 | 2.0 | — | — | — |
| Ethanol | 157.8 | 157.8 | 157.8 | 145.7 | 375.0 | 372.0 | 368.0 | 355.0 | 363.7 | 397.0 | 354.0 | 350.0 | 414.0 | 154.7 | 161.0 | 173.7 |
| n-Butanol | 81.0 | 81.0 | 81.0 | 73.0 | 188.0 | 186.0 | 184.0 | 177.0 | 181.9 | 199.0 | 176.0 | 175.0 | 207.0 | 77.4 | 80.5 | 87.1 |
| Ethylene glycol | — | — | 2.4 | — | — | — | — | — | — | — | 2.0 | 2.0 | — | — | — | — |
| Melamine | — | — | — | 2.4 | — | — | — | — | — | — | — | — | — | — | — | — |

TABLE 1-continued

| | No. | | | | | | | | | | | | | | | |
|---|---|---|---|---|---|---|---|---|---|---|---|---|---|---|---|---|
| | A | B | C | D | E | F | G | H | I | J | K | L | M | N | O | P |
| resin (*1) | | | | | | | | | | | | | | | | |

(*1) "Cymel-303": Trade name, manufactured by Mitsui Toatsu Chemicals, Inc.

PREPARATION EXAMPLE 2

Preparation of condensation products of fluorine-containing silicon compounds for the top coating layer The starting materials identified in Table 2 were mixed in the respective amounts (g) as identified in Table 2. The respective mixtures were reacted for 24 hours under stirring at room temperature, and then filtered to obtain Treating Solutions No. Q to No. U, i.e. treating solutions of condensation products containing fluorine-containing silicon compounds.

TABLE 2

| | No. | | | | |
|---|---|---|---|---|---|
| Starting materials | Q | R | S | T | U |
| $(CH_3O)_3SiC_2H_4C_6F_{12}C_2H_4Si(OCH_3)_3$ | 11.7 | 3.9 | 2.0 | 5.9 | 3.0 |
| $C_9F_{19}C_2H_4Si(OCH_3)_3$*2 | 5.1 | 5.1 | 2.5 | 13.6 | 2.3 |
| $Si(OCH_3)_4$ | 3.8 | 19.0 | 28.5 | 4.4 | 33.2 |
| 1% Acetic acid aqueous solution | 4.4 | 10.1 | 14.1 | 5.0 | 16.4 |
| Dibutyl tin dilaurate | 0.1 | 0.1 | 0.1 | 0.1 | 0.1 |
| tert-Butanol | 275.1 | 261.9 | 252.9 | 321.1 | 235.1 |

*2 Mixture of $C_6$ to $C_{14}$ with an average of $C_9$

PREPARATION EXAMPLE 3

Preparation of condensation products of fluorine-containing silicon compounds for the top coating layer The starting materials identified in Table 3 were mixed in the respective amounts (g) as identified in Table 3. The respective mixtures were reacted for 24 hours under stirring at room temperature, and then filtered to obtain Treating Solutions No. V to No. Y, i.e. treating solutions of condensation products of fluorine-containing silicon compounds.

PREPARATION EXAMPLE 4

Preparation of a condensation product of a fluorine-containing silicon compound for the top coating layer For a Comparative Example, the starting materials identified in Table 4 were mixed in the respective amounts (g) as identified in Table 4, and reacted in the same manner as in Preparation Example 2 to obtain a Treating Solution No. Z.

TABLE 4

| Starting materials | No. Z |
|---|---|
| $CF_3C_2H_4Si(OCH_3)_3$ | 11.0 |
| $Si(OCH_3)_4$ | 19.0 |
| 1% Acetic acid aqueous solution | 11.7 |
| Dibutyl tin dilaurate | 0.1 |
| tert-Butanol | 258.3 |

PREPARATION EXAMPLE 5

Preparation of treating solutions for a primer coating to be optionally formed on a plastic surface Into an autoclave reactor, 70 g of methyl methacrylate, 15 g of 2-hdyroxyethyl methacrylate, 15 g of N,N-

TABLE 3

| | No. | | | |
|---|---|---|---|---|
| Starting materials | V | W | X | Y |
| $(CH_3O)_3SiC_2H_4C_6F_{12}C_2H_4Si(OCH_3)_3$ | 3.9 | 3.9 | 3.9 | 3.9 |
| $C_9F_{19}C_2H_4Si(OCH_3)_3$*3 | 5.1 | — | — | — |
| $CF_3(CF_2)_2OCF(CF_3)CF_2OCF(CF_3)CH_2O(CH_2)_3Si(OCH_3)_3$ | — | 5.0 | — | — |
| $CF_3(CF_2)_7CONH(CH_2)_3Si(OCH_3)_3$ | — | — | 5.1 | — |
| $(CF_3)_2CFC_2H_4Si(OCH_3)_3$ | — | — | — | 5.7 |
| $Si(OCH_3)_4$ | 10.0 | 19.0 | 19.0 | 19.0 |
| 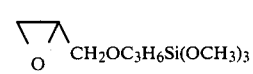 $CH_2OC_3H_6Si(OCH_3)_3$ (glycidoxypropyl) | 5.0 | — | — | — |
| 1% Acetic acid aqueous solution | 7.0 | 10.1 | 10.1 | 10.6 |
| Dibutyl tin dilaurate | 0.1 | 0.1 | 0.1 | 0.1 |
| tert-Butanol | 269.0 | 262.0 | 261.9 | 261.3 |

*3 Mixture of $C_6$ to $C_{14}$ with an average of $C_9$ dimethylaminoethyl methacrylate, 397 g of 2-propanol and 3 g of azobisisobutyronitrile were charged, and after replacing the internal atmosphere of the reactor with nitrogen gas, reacted at 65° C. for 10 hours under stirring to obtain a polymer. To this polymer, 500 g of isopropyl alcohol and 1000 g of ethyl cellusolve were added to obtain Treating Solution No. α.

Separately, 30 g of methyltrimethoxysilane, 20 g of γ-glycidoxypropyltrimethoxysilane, 10 g of 3-methacryloxy propyltrimethoxysilane, 40 g of tetramethoxysilane, 3 g of aluminum acetylacetonate and 400 g of ethanol were mixed, and after an addition of 37.6 g of a 1% hydrochloric acid aqueous solution under stirring, reacted at room temperature for 10 hours to obtain Treating Solution No. β.

EXAMPLE 1

A glass plate having a refractive index of 1.52 (soda lime glass 5×10 cm) was cleaned with a cleaning agent, washed with distilled water and then dried in air. This glass plate was dipped in Treating Solution No. A of the metal oxide-containing condensation product for the undercoating layer as identified in Table 1, withdrawn at a speed of 11 cm/min., then dried at room temperature for 30 minutes, and maintained at 540° C. for 30 minutes for thermal curing, whereby an undercoating layer having a thickness of 0.14 μm and a refractive index of 1.80 was formed. Then, the glass plate formed with this undercoating layer, was dipped in a 2% hydrofluoric acid aqueous solution for 1 minute, then withdrawn, washed with distilled water, dried in air, dipped in Treating Solution No. Q of the condensation product of the fluorine-containing silicon compound for the top coating layer as identified in Table 2, then withdrawn at a speed of 4 cm/min., and maintained at 160° C. for 2 hours, whereby a top coating layer having a thickness of 0.09 μm and a refractive index of 1.40 was formed.

With respect to the low reflectance glass having a thin coating of a two layer structure thus obtained, the reflectance was measured, and was found to be 0.8% per one surface, and the pencil hardness was H. The contact angles of water and hexadecane were 117.5° and 67.6° respectively.

EXAMPLES 2 to 7

Low reflectance glasses formed with coatings of a double layer structure were obtained by the same treatment as in Example 1 except that the metal oxide-containing condensation product for the undercoating layer in Example 1 was selected to be Treating Solutions No. A to No. D in Table 1, the withdrawing speed from dipping and the thermal curing time were changed, further the condensation product of the fluorine-containing silicon compound for the top coating layer was selected to be Treating Solutions No. Q to No. S as shown in Table 2, and the withdrawing speed was changed.

With respect to the low reflectance glasses thus obtained, the thickness, refractive indices, reflectance, pencil hardness and contact angles were measured. The results are shown in Table 5.

COMPARATIVE EXAMPLES 1 and 2

Treating Solution No. Q of the condensation product of a fluorine-containing silicon compound for the top coating layer was applied onto the same glass plate as in Example 1 to form a single layer coating in the same manner as in Example 1. With respect to the glass plate thus obtained, the layer thickness, refractive index, reflectance, pencil hardness and contact angles were measured. Further, with respect to the same glass plate as in Example 1, the reflectance and contact angles in non-treated conditions were measured. The results of the measurements are shown in Table 5.

TABLE 5

|  | Undercoating layer | | | | Top coating layer (*4) | | | | | | Contact angles | |
| --- | --- | --- | --- | --- | --- | --- | --- | --- | --- | --- | --- | --- |
|  | Treating solution No. | Withdrawing speed cm/min. | Thermal curing °C. × min. | Thickness μm | Refractive index | Treating solution No. | Withdrawing speed cm/min. | Thickness μm | Refractive index | Reflectance % | Pencil hardness | Water | Hexadecane |
| Example 2 | A | 11 | 540 × 30 | 0.14 | 1.80 | R | 6 | 0.09 | 1.42 | 1.0 | 3H | 108.4° | 64.8° |
| Example 3 | A | 11 | 540 × 30 | 0.14 | 1.80 | S | 7.5 | 0.09 | 1.43 | 1.2 | >5H | 100.5° | 61.5° |
| Example 4 | B | 14 | 540 × 30 | 0.16 | 1.65 | Q | 4 | 0.09 | 1.40 | 1.1 | H | 117.0° | 67.4° |
| Example 5 | B | 14 | 540 × 30 | 0.16 | 1.65 | S | 7.5 | 0.09 | 1.43 | 1.6 | >5H | 101.5° | 62.0° |
| Example 6 | C | 12 | 200 × 60 | 0.16 | 1.66 | Q | 4 | 0.09 | 1.40 | 0.8 | H | 116.5° | 67.0° |
| Example 7 | D | 13 | 540 × 30 | 0.16 | 1.65 | S | 7.5 | 0.09 | 1.43 | 1.2 | >5H | 100.5° | 61.0° |
| Comparative Example 1 | — | — | — | — | — | Q | 4 | 0.09 | 1.40 | 1.8 | HB | 117.0° | 67.5° |
| Comparative Example 2 | — | — | — | — | — | — | — | — | — | 4.2 | — | <20° | <20° |

(*4) The thermal curing conditions were the same as in Example 1 i.e. 160° C. × 2 hr.

EXAMPLE 8

As the metal oxide-containing condensation product for the undercoating layer in Example 1, Treating Solution No. E identified in Table 1 was used, and a glass plate was dipped therein, withdrawn at a speed of 10 cm/min., then dried at 160° C. for 10 minutes, thereafter dipped in Treating Solution No. F, withdrawn at a speed of 20 cm/min., again dried at 160° C. for 10 minutes, and maintained at 540° C. for 30 minutes for curing, whereby a multi-layer coating comprising two layers i.e. the first undercoating layer having a thickness of 0.07 μm and a refractive index of 1.7 and a second undercoating layer having a thickness of 0.115 μm and a refractive index of 2.10, was formed.

Then, the glass plate formed with these metal oxide layers, was dipped in a 2% hydrofluoric acid aqueous solution for 1 minute, then withdrawn, washed with distilled water, dried in air, then dipped in Treating Solution No. Q i.e. the condensation product containing a fluorine-containing silicon compound for the top coating layer as shown in Table 2, withdrawn at a speed of 6 cm/min., and maintained at 160° C. for 2 hours for thermal curing, whereby a top coating layer having a thickness of 0.09 μm and a refractive index of 1.40 was formed.

With respect to the low reflectance glass formed with

In Examples 14 and 15, the undercoating layers having a two layer structure were maintained at 200° C. for 60 minutes for thermal curing. With respect to the low reflectance glasses thus obtained, the thickness, refractive indices, reflectance, pencil hardness and contact angles were measured. The results are shown in Table 6.

COMPARATIVE EXAMPLE 3

In the same manner as in Example 9, Treating Solutions No. E and No. I identified in Table 1 were used as the metal oxide-containing condensation products for the undercoating layer, and a multi-layer coating comprising two layers was formed on the glass surface, and further by using Treating Solution No. Z identified in Table 4 as the condensation product of a fluorine-containing silicon compound for the top coating layer, a low reflectance glass formed with a thin coating having a three layer structure, was obtained. The properties were measured, and the results are shown in Table 6.

TABLE 6

| | Undercoating layer | | | | | | Top coating layer | | | | | Contact angles | |
| | First layer (on the glass surface) | | | Second layer | | | | | | | | | |
| | Treating solution No. | Thickness μm | Refractive index | Treating solution No. | Thickness μm | Refractive index | Treating solution No. | Thickness μm | Refractive index | Reflectance % | Pencil hardness | Water | Hexadecane |
|---|---|---|---|---|---|---|---|---|---|---|---|---|---|
| Example 9 | E | 0.07 | 1.7 | I | 0.12 | 2.1 | R | 0.09 | 1.42 | 0.3 | 3H | 108.0° | 65.0° |
| Example 10 | E | 0.07 | 1.7 | I | 0.12 | 2.1 | S | 0.09 | 1.43 | 0.3 | >5H | 100.5° | 61.5° |
| Example 11 | G | 0.07 | 1.8 | H | 0.07 | 1.95 | S | 0.09 | 1.43 | 0.45 | >5H | 101.2° | 61.5° |
| Example 12 | F | 0.07 | 1.75 | J | 0.07 | 1.9 | Q | 0.09 | 1.40 | 0.4 | H | 116.5° | 67.0° |
| Example 13 | F | 0.07 | 1.75 | J | 0.07 | 1.9 | S | 0.09 | 1.43 | 0.5 | >5H | 100.5° | 61.0° |
| Example 14 | K | 0.07 | 1.75 | L | 0.07 | 1.9 | Q | 0.09 | 1.40 | 0.4 | 2H | 117.2° | 67.8° |
| Example 15 | K | 0.07 | 1.75 | L | 0.07 | 1.9 | S | 0.09 | 1.43 | 0.5 | >5H | 101.0° | 61.4° |
| Comparative Example 3 | E | 0.07 | 1.7 | I | 0.12 | 2.1 | Z | 0.09 | 1.45 | 0.4 | 3H | 90° | <30° | a thin coating having the three layer structure thus obtained, the reflectance was measured, and found to be 0.25% per one surface, and the pencil hardness was H. Further, the contact angles of water and hexadecane were 117.2° and 67.5°, respectively.

EXAMPLES 9 to 15

In the same manner as in Example 8, the metal oxide-containing condensation product for the undercoating layer was selected to be Treating Solutions No. E to No. L as identified in Table 1, and a multi-layer coating comprising two layers was formed on the glass surface, and further, by using Treating Solutions No. Q to No. S shown in Table 2 as the condensation products of fluorine-containing silicon compounds for the top coating layer, low reflectance glasses formed with thin coatings having a three layer structure were obtained.

EXAMPLES 16 to 23

In the same manner as in Example 8, Treating Solutions No. E to No. J identified in Table 1 were used as the metal oxide-containing condensation products for the undercoating layer, and multi-layer coatings comprising two layers, were formed on glass surfaces, and further by using Treating Solutions No. V to No. Y identified in Table 3 as the condensation products of fluorine-containing silicon compounds for the top coating layer, low reflectance glasses formed with thin layers having a three layer structure were obtained. The properties of the low reflectance glasses were measured. The results are shown in Table 7.

TABLE 7

| | Undercoating layer | | | | | | Top coating layer | | | | | Contact angles | |
| | First layer (on the glass surface) | | | Second layer | | | | | | | | | |
| | Treating solution No. | Thickness μm | Refractive index | Treating solution No. | Thickness μm | Refractive index | Treating solution No. | Thickness μm | Refractive index | Reflectance % | Pencil hardness | Water | Hexadecane |
|---|---|---|---|---|---|---|---|---|---|---|---|---|---|
| Example 16 | E | 0.07 | 1.7 | I | 0.12 | 2.1 | V | 0.09 | 1.42 | 0.3 | 3H | 100.8° | 60.5° |
| Example 17 | E | 0.07 | 1.7 | I | 0.12 | 2.1 | W | 0.09 | 1.42 | 0.3 | 2H | 108.1° | 65.0° |
| Example 18 | E | 0.07 | 1.7 | I | 0.12 | 2.1 | X | 0.09 | 1.43 | 0.3 | 3H | 107.5° | 64.9° |
| Example 19 | E | 0.07 | 1.7 | I | 0.12 | 2.1 | Y | 0.09 | 1.43 | 0.3 | 4H | 104.5° | 61.5° |
| Example 20 | F | 0.07 | 1.75 | J | 0.07 | 1.9 | V | 0.09 | 1.42 | 0.45 | 3H | 100.7° | 60.6° |
| Example 21 | F | 0.07 | 1.75 | J | 0.07 | 1.9 | W | 0.09 | 1.42 | 0.45 | 2H | 108.5° | 65.0° |
| Example 22 | F | 0.07 | 1.75 | J | 0.07 | 1.9 | X | 0.09 | 1.43 | 0.5 | 3H | 107.5° | 64.7° |
| Example 23 | F | 0.07 | 1.75 | J | 0.07 | 1.9 | Y | 0.09 | 1.43 | 0.5 | 4H | 104.4° | 61.6° |

EXAMPLE 24

A glass plate having a refractive index of 1.52 (soda lime glass 5×10 cm) was cleaned with a cleaning agent, washed with distilled water and then dried in air. This glass plate was dipped in Treating Solution No. M of the metal oxide-containing condensation product for the undercoating layer as identified in Table 1, then withdrawn at a speed of 5 cm/min., and dried at 160° C. for 10 minutes. After cooling, the coated plate was dipped in Treating Solution No. E, withdrawn at a speed of 7 cm/min., dried at 160° C. for 10 minutes, then cooled, and further dipped in Treating Solution No. I, withdrawn at a speed of 16 cm/min., dried at 160° C. for 10 minutes, then maintained at a temperature of 540° C. for 30 minutes for thermal curing, whereby a first layer having a thickness of 0.05 $\mu$m and a refractive index of 1.46, a second layer having a thickness of 0.06 $\mu$m and a refractive index of 1.70, and a third layer having a thickness of 0.11 $\mu$m and a refractive index of 2.10, were formed. Then, the glass plate formed with the undercoating layer comprising these three layers, was dipped in a 15% sodium hydroxide aqueous solution for 5 minutes, then withdrawn, washed with distilled water, dried in air, then dipped in Treating Solution No. S of the condensation product of a fluorine-containing silicon compound for the top coating layer as shown in Table 2, withdrawn at a speed of 5 cm/min., and maintained at 160° C. for 2 hours for thermal curing, whereby a top coating layer having a thickness of 0.085 $\mu$m and a refractive index of 1.43, was formed. With respect to the low reflectance glass formed with a thin coating having a four layer structure thus obtained, the reflectance was measured and found to be 0.35% per one surface, and the pencil hardness was at least 5H. Further, the contact angles of water and hexadecane were 100.5° and 61.5°, respectively.

EXAMPLE 25

A quick drying type black ink (for felt-pens) was applied to the surface of each of the low reflectance glasses obtained in Examples 1 to 24 to stain the surface. One hour later, the surface was wiped with a cotton cloth, whereby the black ink on each low reflectance glass was readily removed.

COMPARATIVE EXAMPLE 4

A quick drying type black ink was applied on the surface of each of the glasses treated in Comparative Examples 2 and 3, and then wiped in the same manner as in Example 25, it was impossible to completely remove the ink, and scratch marks appeared on the coating layer.

EXAMPLE 26

A flat plate (5×5 cm) of poly(diethylene glycol bisallylcarbonate) was dipped in a 10% sodium hydroxide solution heated to 50° for 1 minute, and immediately washed with water and dried. This flat plate was dipped in Treating Solution NO. N of the metal oxide-containing condensation product identified in Table 1 of Preparation Example 1, withdrawn at a speed of 10 cm/min., dried at 120° C. for 10 minutes to form a undercoating layer, then, again dipped in Treating Solution No. N, withdrawn at a speed of 10 cm/min., and dried at 120° C. for 10 minutes to form a undercoating layer composed of two layers having a refractive index of 1.90 and a thickness of 0.13 $\mu$m.

Then, the flat plate formed with the above-mentioned undercoating layer was dipped in Treating Solution No. T of a fluorine-containing silicon condesation product as identified in Table 2 of Preparation Example 2, withdrawn at a speed of 7.5 cm/min., thermally treated at 120° C. for 90 minutes, to form a top coating layer having a refractive index of 1.40 and a thickness of 0.09 $\mu$m.

The reflectance of the flat plate formed with a thin coating layer thus obtained, was 0.7% per one surface. Further, the contact angles of water and hexadecane were 110.5° and 70.5°, respectively.

EXAMPLES 27 to 31

The treatments were conducted in the same manner as in Example 26 except that the treating solution of the metal oxide-containing condensation product for the undercoating layer in Example 26 was selected to be Treating Solutions No. N to No. P identified in Table 1, and further the treating solution of the condensation product containing a fluorine-containing silicon compound for the top coating layer, was selected to be Treating Solutions No. T and No. U as identified in Table 2, whereby flat plates formed with thin coatings were obtained. The properties of the flat plates formed with the thin layers thus obtained, were measured. The results are shown in Table 8.

EXAMPLES 32 and 33

Instead of the dipping treatment of the flat plate in the 10% sodium hydroxide solution in Example 28, flat paltes were, respectively, dipped in Treating Solutions No. $\alpha$ and No. $\beta$ for primer coatings of Preparation Example 5, withdrawn at a speed of 7 cm/min., and then heat treated at 120° C. for 30 minutes to form the primer layer. The flat plates thus formed with the primer layers, were treated in the same manner as in Example 26, whereby thin coatings were formed on the respective primer layers, and flat plates formed with the thin layer was obtained.

The properties of the flat plates formed with the thin layers thus obtained, were measured. The results are shown in Table 8.

COMPARATIVE EXAMPLES 5 and 6

The treatment was conducted in the same manner as in Example 26 except that the treating solution for the top coating layer comprising a fluorine-silicon condensation product in Example 26 was changed to Treating Solution No. Z, to obtain a flat plate formed with a thin coating.

The properties of the flat plate formed with the thin coating thus prepared and the flat plate to which no treatment for the formation of the thin coating was applied in Example 26, were measured. The results are shown in Table 8.

TABLE 8

| | Flat plate treatment | Under coating layer | | Thickness (*5) μm | Refractive index | Top coating layer | | | Reflectance | Contact angle | |
|---|---|---|---|---|---|---|---|---|---|---|---|
| | | Treating solution No. for the first layer | Treating solution No. for the second layer | | | Treating solution No. | Thickness μm | Refractive index | | Water | Hexadecane |
| Example 27 | 10% NaOH | N | N | 0.13 | 1.9 | U | 0.09 | 1.43 | 1.0 | 102.5° | 67.0° |
| Example 28 | " | O | N | 0.07 / 0.07 | 1.75 / 1.9 | U | 0.09 | 1.43 | 0.6 | 101.5° | 66.5° |
| Example 29 | " | P | P | 0.13 | 1.9 | U | 0.09 | 1.43 | 1.0 | 102.0° | 67.0° |
| Example 30 | " | P | P | 0.13 | 1.9 | T | 0.09 | 1.40 | 0.7 | 110.5° | 70.5° |
| Example 31 | " | O | P | 0.07 / 0.07 | 1.75 / 1.9 | U | 0.09 | 1.43 | 0.7 | 101.0° | 66.0° |
| Example 32 | Treating solution No. α | O | N | 0.07 / 0.07 | 1.75 / 1.9 | U | 0.09 | 1.43 | 0.5 | 100.0° | 66.0° |
| Example 33 | Treating solution No. β | O | N | 0.07 / 0.07 | 1.75 / 1.9 | U | 0.09 | 1.43 | 0.5 | 102.0° | 66.5° |
| Comparative Example 5 | — | N | N | 0.13 | 1.9 | Z | 0.09 | 1.45 | 2.0 | 83.0° | <30° |
| Comparative Example 6 | — | — | — | — | — | — | — | — | 4.0 | 80.0° | <20° |

(*5) The value given first is of the first layer. The value given below the first value is of the second layer.

EXAMPLE 34

The treatment was conducted in the same manner as in Example 32 except that a flat plate (5×5 cm) of polycarbonate was used, whereby a flat plate formed with a thin coating was obtained.

The properties of the flat plate thus obtained were measured. The results are shown in Table 9.

EXAMPLE 35

The treatment was conducted in the same manner as in Example 33 except that a flat plate (5×5 cm) of polymethyl methacrylate was used, whereby a flat plate formed with a thin coating was obtained.

The properties of the flat plate thus prepared were measured. The results are shown in Table 9.

TABLE 9

| | Flat plate | | Undercoating layer | | | | Top coating layer | | | Reflectance % | Contact angles | |
|---|---|---|---|---|---|---|---|---|---|---|---|---|
| | Material (*6) | Treating solution No. | Treating solution No. for the first layer | Treating solution No. for the second layer | Thickness μm | Refractive index | Treating solution No. | Thickness μm | Refractive index | | Water | Hexadecane |
| Example 34 | PC | No. α | O | N | 0.07 / 0.07 | 1.9 | U | 0.09 | 1.43 | 0.6 | 99.5 | 65.0 |
| Example 35 | PMMA | No. β | O | N | 0.07 / 0.07 | 1.9 | U | 0.09 | 1.43 | 0.5 | 101.5 | 65.0 |

(*6) PC: Polycarbonate, PMMA: Polymethyl methacrylate

EXAMPLES 36 to 39

In Example 32, after the formation of the undercoating layer of the metal oxide-containing condensation product, the activating treatment of the thin coating as identified in Table 10 was conducted, followed by washing with water and drying. Then, a top coating layer was formed on the thin layer in the same manner as in Example 32.

As the properties of the flat plates formed with the thin layers thus obtained, the respective antisoiling properties were tested by the removal of the black ink in the same manner as in Example 25. The results are shown in Table 10.

TABLE 10

| | Activating treatment of a thin coating | Removal of ink*7 |
|---|---|---|
| Example 36 | After the formation of the top coating layer, irradiation was applied for 5 minutes with 2 KW mercury lamp | A |
| Example 37 | After the formation of the undercoating layer, the flat plate was dipped in a warm water of 50° C. for 30 minutes | A |
| Example 38 | After the formation of the undercoating layer, the flat plate was dipped in a 5% sodium hydroxide aqueous solution of 20° C. for 1 minute | A |
| Example 39 | — | B |

*7A: The ink was repelled and completely wiped off.
B: Similar to A, but certain scratch marks were observed on the thin coating.

We claim:

1. A low reflectance transparent material having antisoiling properties, which comprises a transparent substrate and a multi-layer coating formed on the substrate, said coating comprising at least one thin layer of a condensation product containing a metal oxide, and a thin layer of a condensation product of a fluorine-containing silicon compound having a perfluorocarbon chain containing from 3 to 20 carbon atoms, formed thereon.

2. The low reflectance transparent material according to claim 1, wherein the transparent substrate is made of glass.

3. The low reflectance transparent material according to claim 1, wherein the transparent substrate is made of a plastic.

4. The low reflectance transparent material according to claim 1, wherein the thin layer of a condensation product containing a metal oxide has a thickness of at most 0.3 μm.

5. The low reflectance transparent material according to claim 1, wherein the condensation product containing a metal oxide is a co-condensation product containing a $SiO_2$ compound and a $TiO_2$ compound or a $ZrO_2$ compound.

6. The low reflectance transparent material according to claim 1, wherein the thin layer of a condensation product of a fluorine-containing silicon compound having a perfluorocarbon chain has a thickness of at most 0.2 μm.

7. The low reflectance transparent material according to claim 6, wherein the fluorine-containing silicon compound is a dialkoxy silane or trialkoxy silane compound having a perfluoroalkyl group containing from 3 to 20 carbon atoms.

8. The low reflectance transparent material according to claim 6, wherein the fluorine-containing silicon compound is a compound having a perfluoroalkylene group containing from 3 to 12 carbon atoms and a silyl group at each end.

9. The low reflectance transparent material according to claim 1, wherein the condensation product of a fluorine-containing silicon compound having a perfluorocarbon chain is a co-condensation product with a silane coupling agent.

* * * * *